June 24, 1941.  R. A. BAUDRY  2,246,912
GLAND SEAL FOR ROTATING SHAFTS
Filed Jan. 18, 1939  2 Sheets-Sheet 1

WITNESSES:
E. F. Oberheim.
F. P. Lyle

INVENTOR
René A. Baudry.
BY
O. R. Buchanan
ATTORNEY

June 24, 1941.  R. A. BAUDRY  2,246,912
GLAND SEAL FOR ROTATING SHAFTS
Filed Jan. 18, 1939   2 Sheets-Sheet 2
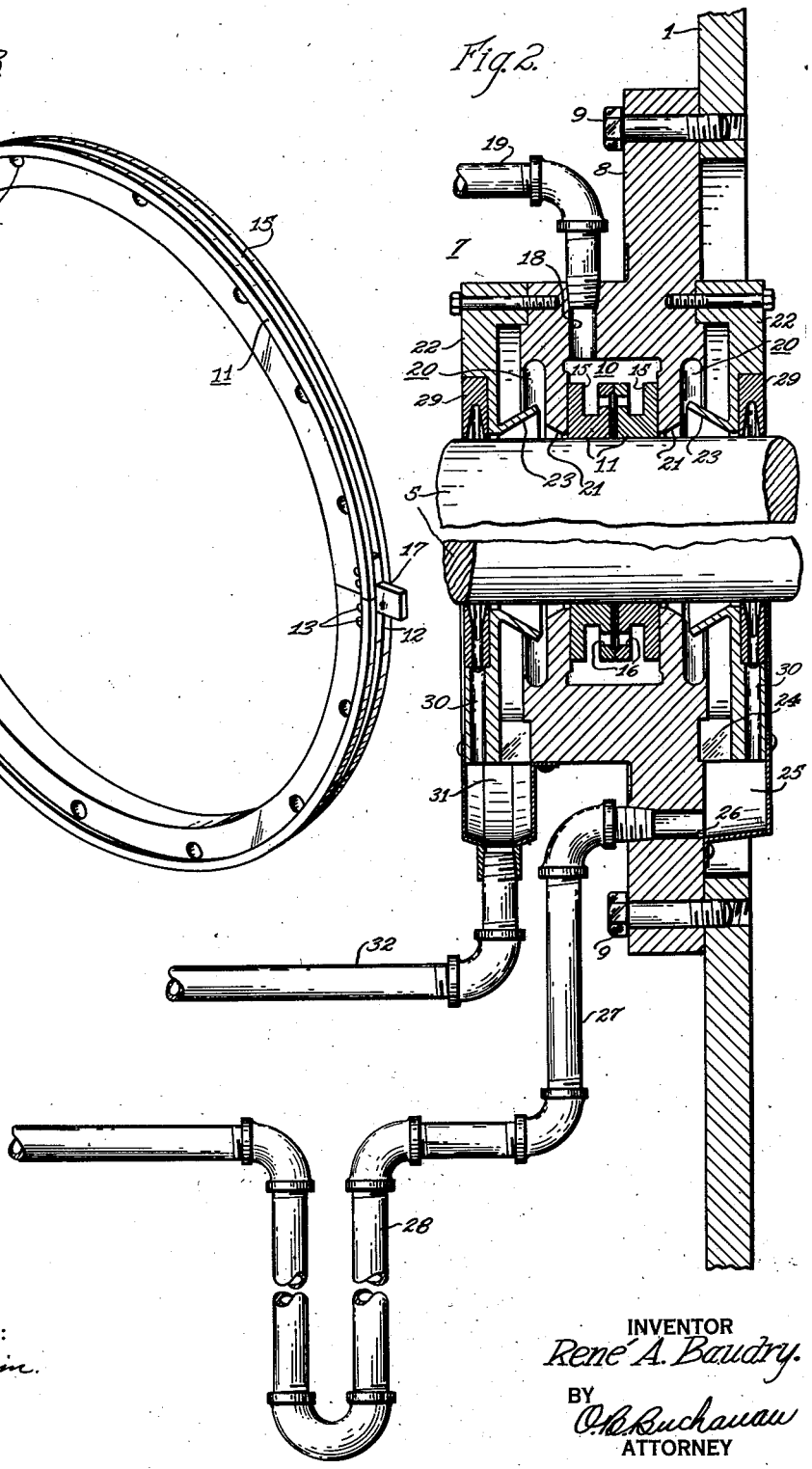
INVENTOR
René A. Baudry.
BY
ATTORNEY
WITNESSES:

Patented June 24, 1941

2,246,912

UNITED STATES PATENT OFFICE 2,246,912

GLAND SEAL FOR ROTATING SHAFTS

René A. Baudry, Pittsburgh, Pa., assignor to Westinghouse Electric & Manufacturing Company, East Pittsburgh, Pa., a corporation of Pennsylvania Application January 18, 1939, Serial No. 251,518

7 Claims. (Cl. 286—9)

The present invention relates to gland seals for rotating shafts, and more particularly to a liquid seal for preventing leakage of gas along the rotating shaft of an enclosed machine, such as a totally enclosed, gas-ventilated dynamo-electric machine.

The seal of the present invention is especially adapted for use with hydrogen cooled dynamo-electric machines, although it may also be used with other types of enclosed machines to prevent leakage of gas along a rotating shaft. When hydrogen is used as the cooling medium for a dynamo-electric machine, the machine is completely enclosed in a gas-tight housing, within which the gas is circulated, and it is necessary to provide a gas-tight seal at the points where the shaft of the machine passes through the housing in order to prevent the leakage of gas out of the machine or the leakage of air into the housing, since hydrogen and air form an explosive mixture which constitutes a source of considerable danger.

Liquid seals have been used for this purpose in which a flow of liquid, such as oil, over the shaft opposes the flow of gas, but such seals have several disadvantages. The oil carries with it small amounts of air which are thus introduced into the machine through the seal. In addition to this, large quantities of oil are necessary, and since this oil is in direct contact with the hydrogen, a considerable amount of hydrogen will dissolve in the oil and thus be carried out of the machine, so that the amount of hydrogen in the housing is reduced and air is introduced into the housing. This is undesirable since it may cause an explosive mixture in the housing, and relatively elaborate equipment for treating the oil to remove the hydrogen from it is required.

It has been proposed to reduce these disadvantages by restricting the flow of oil in the seal to a minimum so as to keep to a minimum the amount of air carried into the housing in this way, and to restrict the amount of oil in contact with the hydrogen, so that only a small amount can escape from the housing by dissolving in the oil. This may be done by using split rings held onto the shaft by springs and feeding the oil between the rings so that it flows along the shaft through the small clearance between the rings and the shaft in a direction to oppose the escape of gas from the housing. A seal of this type is shown, for example, in the patent to G. W. Penney, No. 1,840,127, issued January 5, 1932, and assigned to Westinghouse Electric & Manufacturing Company.

It has been found, however, in the operation of liquid gland seals of this type that a rather large amount of air is pumped continuously into the seal in the space between the rings. The reason for this appears to be that the clearance between the rings and the rotating shaft is not uniform. This clearance is filled with a layer of oil which rotates at approximately one-half the peripheral speed of the shaft. In the parts of the periphery where the clearance is decreasing and the flow of oil is convergent, a high pressure will be maintained, but where the clearance is increasing and the flow of oil is divergent, the pressure becomes quite low. These low-pressure regions cause a considerable amount of air to be drawn into the seal and this creates a very undesirable condition which interferes with the proper operation of the seal.

The object of the present invention is to provide a liquid gland seal for a rotating shaft in which the flow of oil or other liquid is kept to a minimum by rigid sealing rings encircling the shaft with a small clearance, and in which the oil is fed uniformly at a plurality of points about the periphery of a narrow space between the rings, so that the flow of oil is kept as uniform as possible and the pressure of the oil is uniform throughout, thus preventing the sucking action described above.

A further object of the invention is to provide an improved oil catching means for collecting the oil flowing along the rotating shaft. It is necessary, when using a liquid seal, to provide some means for collecting the oil which flows from the seal along the shaft, since otherwise it would be carried into the housing and discharged therein in the form of a mist or spray which would be very detrimental to the machine. The present invention, therefore, provides a very effective catching device, which may be combined with the seal, to collect the oil flowing along the shaft and prevent it from entering the machine.

Other objects and advantages of the invention will be apparent from the following detailed description, taken in connection with the accompanying drawings, in which:

Fig. 2 is an enlarged sectional view showing the gland seal and oil catching device of the invention; and Fig. 3 is a perspective view of a sealing ring.

Figure 1:
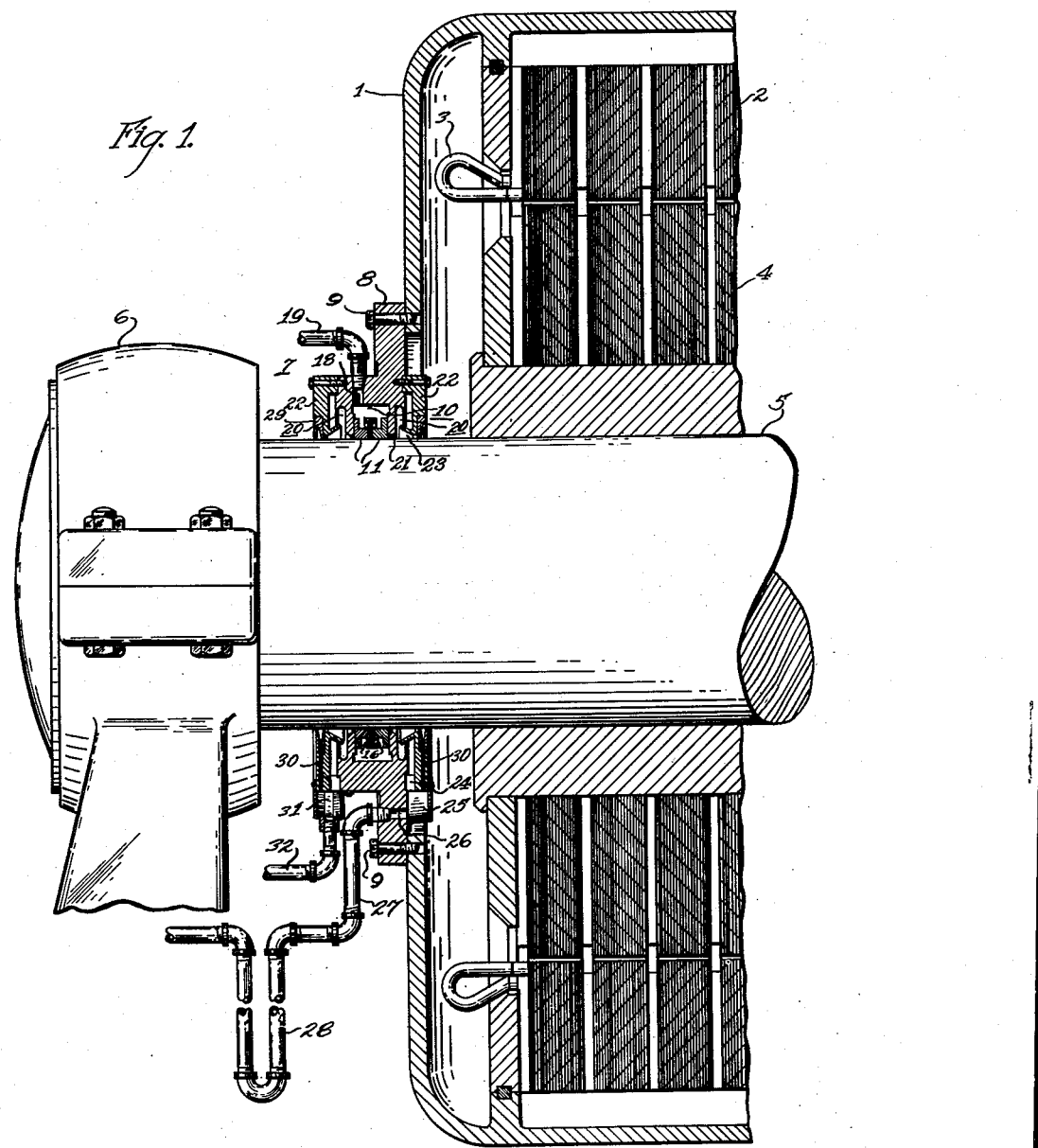
Figure 1 shows a somewhat diagrammatic longitudinal sectional view of a totally enclosed dynamo-electric machine embodying the present invention.

Figure 1 shows somewhat diagrammatically a dynamo-electric machine intended for hydrogen cooling. This machine has a generally cylindrical, gas-tight housing 1 on the interior of which a laminated stator core 2 is supported in any suitable manner. Stator windings 3 of any desired type are placed in slots in the stator core. A rotor member 4 is secured to a shaft 5 which passes through the end of the housing and is supported for rotation in a bearing 6 of any suitable type. The housing 1 of the machine is filled with hydrogen which is circulated to provide ventilation for the machine, and suitable means are provided in the housing for cooling the hydrogen. In order to prevent escape of the hydrogen along the shaft where it passes through the housing, a liquid gland seal, indicated generally at 7, is provided.

As shown more clearly in Fig. 2, the seal 7 has a housing member 8 which is secured to the housing 1 of the machine in any suitable manner, as by bolts 9. The joint between the seal housing 8 and the housing 1 of the machine is, of course, made gas-tight by means of a gasket, or in any other desired manner. The housing member 8 is of generally circular shape, having a central opening through which the shaft 5 passes. The housing 8 is provided with an annular groove 10 forming a chamber surrounding the shaft, and two sealing rings 11 are placed in this groove. These rings have a close fit in the groove and fit on the shaft with a small clearance of the order of three or four-thousandths of an inch.

Each ring, as shown more clearly in Fig. 3, consists of two semi-circular halves which are joined together by keys 12 on each side secured to the rings by rivets 13. The ring has an annular shoulder 14 on one side so that the axial thickness of the ring is greater at its outer periphery than in the remaining portion. The ring also has an annular groove 15 in its outer periphery which extends radially inward well below the shoulder 14, and a plurality of uniformly spaced holes 16 extend through one wall of this groove on the same side of the ring as the shoulder 14 and below the shoulder. The rings are prevented from rotating with the shaft by an extending lug 17 on one of the keys 12 which fits into a cooperating recess in the housing 8, or by any other suitable means.

The rings, as stated above, have a close fit in the groove 10 of the housing 8 and are assembled with their shoulders 14 facing each other and in contact, so that the rings contact each other at their outer peripheries but leave a narrow, annular space between them encircling the shaft. It will be seen that the holes 16 provide communication between the groove 10 and this narrow, annular space. A duct or channel 18 is formed in the upper part of the housing 8 communicating with the annular chamber formed by the groove 10, and an inlet pipe 19 is connected to this duct. The pipe 19 is connected to any suitable source of oil, or other liquid, and may conveniently be connected to the oiling system for the bearing 6, so that part of the lubricating oil for the bearing may be used in the seal.

In operation, oil is supplied through the pipe 19 and fills the chamber 10. From this chamber the oil flows through the holes 16 into the narrow space around the shaft between the rings 11, and a small amount of oil flows axially along the shaft in both directions from this space through the small clearance between the rings and the shaft to oppose the flow of hydrogen from the interior of the housing 1 along the shaft, and also to prevent any flow of air from the outside of the machine along the shaft into the housing. Since the rings 11 are rigid and the oil is fed uniformly to the space between them at a plurality of points around the shaft, the pressure in the oil film between the rings and the shaft will be uniform and there will be no tendency to draw air into the seal.

With this type of seal it is necessary to provide some collecting means for the oil flowing along the shaft to prevent it from being carried into the housing. A very effective type of collecting device for this purpose is provided by the present invention which may conveniently be combined with the seal, as shown in the drawings. This collecting device may be provided on both sides of the seal to catch the oil flowing in both directions therefrom, or if desired, it may only be used on the inside end of the seal to prevent the oil from flowing into the machine, while the oil flowing in the opposite direction is permitted to flow into the bearing with the bearing lubricating oil.

As shown in Fig. 2, the oil catching means consists of an annular chamber 20 formed in the housing 8 and connected to the restricted central opening in the housing adjacent the groove 10 by a sloping surface 21. A ring 22 is secured to the housing 8 and has a generally conical flange 23 surrounding the shaft with its end of greatest radius extending into the chamber 20. At the bottom of the ring 22 a channel 24 is formed in it for drainage of the oil into a chamber 25. A duct 26 extending through the housing 8 communicates with the chamber 25 and a discharge pipe 27 is connected to the duct 26.

When the shaft is rotating and oil is flowing through the seal, the oil flowing along the shaft in the restricted space between the shaft and the housing rotates with the shaft at approximately half its peripheral speed. The gas in the chamber 20 is also rotated by the shaft at approximately the same speed and the combined effects of the centrifugal force on the oil, and the rotating gas in the chamber 20, causes the oil to flow radially outward along the sloping surface 21 into the chamber 20 where it is thrown towards the outer wall. The oil flows along the outer wall of the chamber 20 and is caught by the conical flange 23 which prevents it from dripping back onto the shaft but permits it to flow around to the lower part of the housing and drain out through channel 24 and duct 26 into the discharge pipe 27. A trap 28 is provided in this pipe to prevent the hydrogen from escaping with the oil, and the pipe may discharge into a suitable sump from which the oil can be taken and treated in any desired or necessary manner and recirculated through the system. If desired, a grooved ring 29 of any usual type may also be provided to catch any oil which may be carried past the chamber 20. Oil collected by this ring drains out through a channel 30 into the chamber 25.

The oil catcher at the opposite side of the seal, if provided, functions in the same manner and the oil drains out into a chamber 31 from which it flows into a discharge pipe 32 which may discharge it into the same sump as the pipe 27.

It will be seen, therefore, that a liquid gland seal has been provided for a rotating shaft in which the flow of oil, or other liquid, is kept to a minimum by rigid sealing rings having a small clearance with the shaft through which the oil flows, and that the oil is fed uniformly at a plurality of points into a narrow space between the rings to insure that the pressure in the rotating film of oil in the seal will be uniform throughout to prevent any effect of pumping air into the seal. It will also be seen that a very effective oil catching means has been provided, which may conveniently be combined with the seal itself, to collect the oil flowing along the shaft from the seal and drain it off, thus preventing it from following the shaft into the machine.

Although a specific embodiment of the invention has been shown and described, it is to be understood that it is not limited to the exact details of construction shown, but that it is capable of various other embodiments or modifications without departing from the spirit of the invention. The invention is not limited, therefore, to the exact embodiment shown but in its broadest aspect it includes all equivalent modifications and embodiments which fall within the scope of the appended claims.

I claim as my invention:

1. In combination with an enclosed, gas-filled machine having a rotatable shaft, sealing means to prevent the escape of gas or the entrance of air along the shaft comprising a housing, a pair of sealing rings supported in a groove in the housing and encircling the shaft, said rings being in contact at their outer peripheries but providing a narrow annular space between them around the shaft, means for feeding a liquid into said annular space at a plurality of points spaced uniformly around the circumference of the rings so that a small amount of liquid will flow along the shaft between the shaft and the rings in both directions, and means on at least one side of the seal for catching the liquid flowing along the shaft and draining it off.

2. In combination with an enclosed, gas-filled machine having a rotatable shaft, sealing means to prevent the escape of gas or the entrance of air along the shaft comprising a housing secured to the machine and surrounding the shaft, a pair of sealing rings supported in a groove in the housing and encircling the shaft, said rings being in contact at their outer peripheries but providing a narrow annular space between them around the shaft, means for feeding a liquid into said annular space from both sides, at a plurality of points spaced uniformly around the circumference of the rings so that a small amount of liquid will flow along the shaft between the shaft and the rings in both directions, and means for catching the liquid flowing out of the seal along the shaft and draining it off.

3. In combination with an enclosed, gas-filled machine having a rotatable shaft, sealing means to prevent the escape of gas or the entrance of air along the shaft comprising a housing, a pair of sealing rings supported in a groove in the housing and encircling the shaft, said rings being in contact at their outer peripheries but providing a narrow annular space between them around the shaft, each ring having a groove in its outer periphery and a plurality of openings through one wall of the groove communicating with said annular space, means for feeding a liquid into said groove in the housing so that it may flow through said openings in the rings into said annular space whereby a small amount of liquid will flow along the shaft in both directions between the shaft and the rings, and means on at least one side of the seal for catching liquid flowing along the shaft and draining it off.

4. A gland seal for preventing the leakage of gas along a rotatable shaft comprising a housing member surrounding the shaft, a pair of sealing rings supported in a groove in the housing member and encircling the shaft, said rings being in contact with each other at their outer peripheries but providing a narrow annular space between them immediately adjacent the shaft, and means for feeding a liquid through the rings into said space at a plurality of points spaced around it whereby a small amount of liquid will flow through said space to the shaft and along the shaft in both directions between the shaft and the rings to oppose the flow of gas along the shaft.

5. A gland seal for preventing the leakage of gas along a rotatable shaft comprising a housing member surrounding the shaft, a pair of sealing rings supported in a groove in the housing member and encircling the shaft, said rings being in contact with each other at their outer peripheries but providing a narrow annular space between them adjacent the shaft, each ring having a groove in its outer periphery with a plurality of circumferentially spaced holes extending through one wall of the groove to communicate with said annular space, and means for feeding a liquid into said groove in the housing whereby it will flow through said grooves and holes in the rings into said annular space, and a small amount of liquid will flow along the shaft in both directions between the shaft and the rings to oppose the flow of gas along the shaft.

6. A sealing ring for use in a liquid gland seal, said ring having an annular groove in its outer periphery and a plurality of holes extending through one wall of the groove and spaced apart circumferentially around the ring, said wall having an annular shoulder at its outer periphery and said holes being positioned radially inward of the shoulder.

7. A sealing ring for use in a liquid gland seal comprising two semi-circular halves, keys securing the two halves together to form a complete ring, the axial thickness of the outer peripheral portion of the ring being slightly greater than that of the remaining portion, said ring having an annular groove in its outer periphery extending below the thicker portion and a plurality of circumferentially spaced holes extending through one wall of the groove near the bottom thereof.

RENÉ A. BAUDRY.